US008024525B2

(12) United States Patent
Willis et al.

(10) Patent No.: US 8,024,525 B2
(45) Date of Patent: Sep. 20, 2011

(54) STORAGE CONTROL UNIT WITH MEMORY CACHE PROTECTION VIA RECORDED LOG

(75) Inventors: Kenneth Lewis Willis, Westminster, CO (US); Raymond Duchesne, Round Hill, VA (US)

(73) Assignee: Digi-Data Corporation, Columbia, MD (US)

( * ) Notice: Subject to any disclaimer, the term of this patent is extended or adjusted under 35 U.S.C. 154(b) by 642 days.

(21) Appl. No.: 12/220,622

(22) Filed: Jul. 25, 2008

(65) Prior Publication Data

US 2009/0031083 A1 Jan. 29, 2009

Related U.S. Application Data

(60) Provisional application No. 60/961,967, filed on Jul. 25, 2007.

(51) Int. Cl.
*G06F 12/08* (2006.01)
*G06F 12/16* (2006.01)

(52) U.S. Cl. ................. 711/135; 711/E12.022; 711/162
(58) Field of Classification Search ........................ None
See application file for complete search history.

(56) References Cited

U.S. PATENT DOCUMENTS

| | | |
|---|---|---|
| 5,809,527 A | 9/1998 | Cooper et al. |
| 6,687,791 B2 | 2/2004 | Morrison |
| 6,910,100 B2 | 6/2005 | Lewalski-Brechter |
| 6,952,757 B2 | 10/2005 | Carlson et al. |
| 7,010,721 B2 | 3/2006 | Vincent |
| 7,117,320 B2 | 10/2006 | Ashmore et al. |
| 2002/0029319 A1 | 3/2002 | Robbins et al. |
| 2002/0194442 A1 | 12/2002 | Yanai et al. |
| 2003/0014602 A1 | 1/2003 | Shibayama et al. |
| 2003/0177308 A1 | 9/2003 | Lewalski-Brechter |
| 2003/0229754 A1 | 12/2003 | Micka et al. |
| 2004/0215883 A1 | 10/2004 | Bamford et al. |
| 2005/0278483 A1 | 12/2005 | Andruszkiewicz et al. |
| 2006/0090045 A1 | 4/2006 | Bartlett et al. |
| 2006/0161731 A1* | 7/2006 | Nakatani et al. .............. 711/113 |
| 2007/0033437 A1* | 2/2007 | Kawamura et al. ............. 714/20 |
| 2007/0220309 A1* | 9/2007 | Andre et al. ...................... 714/6 |

* cited by examiner

*Primary Examiner* — Denise Tran
(74) *Attorney, Agent, or Firm* — Herbert F. Ruschmann

(57) ABSTRACT

A "Logging" method and apparatus is provided to protect control unit cached data not yet written to backing storage disk drives. This recording mechanism copies "WRITE DATA" to a log at a target logically external or physically external to storage control units which are connected to a common storage pool and constitute a set. Upon failure of one of the set of control units, the "Log" information is available to insure that pending "write" data is written to the proper location on the disk drives of the storage pool upon a recovery action. One of surviving members of the set assumes control of the storage managed by the failing control unit by utilizing the recorded information to insure that data not written to backing storage (disks) up to the point of failure is then written to the disk backing storage. The surviving member of the set recovering the failing control unit storage (disk set) ownership effects a "flush" of (WRITE) the Journaled WRITE DATA to the backing storage disk drives before allowing normal operations to proceed.

14 Claims, 9 Drawing Sheets

STORAGE CONTROL UNIT WITH MEMORY CACHE PROTECTION VIA RECORDED LOG

RELATED APPLICATION

This non-provisional patent application claims priority to provisional application Ser. No. 60/961,967, filed Jul. 25, 2007, and incorporates by reference said application.

BACKGROUND INFORMATION

A storage control unit has a role of providing control and connection management of an aggregation of disks to client computing systems. The storage control unit is able to identify and parse out the required amount of storage capacity to a given client computer via some administrative interface.

Client computer systems handle write data at file level via a file system implemented by the client computer systems. Using the file system and structure client computers may employ a cache system for storing write data at file level prior to converting to block level addresses and writing the data to backing storage disks. Such cache systems secure data and are sometimes employed to provide for data comparison and integrity verification and are tightly integrated with client computing systems and file structures of those systems. Such cache systems do not address block level protocol data storage or potential failure and recovery of storage control units operating using address block level protocol.

The storage control unit provides the data transport medium (channels) to the disk drives. In this role, the storage control unit serves as the intermediary between the storage and the client computer systems that store and retrieve data to and from the storage subsystem. The storage control unit (channel) transport connection to the storage devices are commonly physical SCSI, Serial Addressed SCSI (SAS), or Fibre Channel connection, though other physical device connection types do exist.

The storage control unit, in turn, provides client computing systems a similar "channel" connection, such as ESCON, FICON, SCSI, SAS, or Fibre Channel. Again, these examples represent the more common connections of the larger set of channel transport available in computing at the time of the patent submission.

A single or multiple set of control units 1 to "n" provide benefit to host systems by presenting a centralized, robust, intelligent, and programmed interface representing a managed storage pool. This interface simplifies the management of storage for the client computers. The storage control unit(s) often provides a logical representation of storage independent of the topology and geometry of the disk drives. Additionally, it is frequently found that control units also provide data protection via RAID provisions and other storage management functions.

SUMMARY OF THE INVENTION

Problem Defined

Disk drives have a set of read/write heads that move via programmed control to access selected data recording tracks and fields. Thus, each of the disk devices, with rotating media predominantly encounters time delays in reading or writing data due to rotational and head positioning latency.

During the 1970's it was noted that a considerable performance advantage could be derived by using a memory cache within control unit(s), also termed storage controller(s), as an intermediary storage location instead of directly accessing disk. Once the data was staged to the memory established for this intermediary role, access to the data was much quicker than by reading or writing disk with the accompanied latency delays in response.

Algorithms were subsequently perfected to maintain data within a control unit memory cache so as to closely match the reference patterns for the client computing systems data transfers. The memory cache algorithms allowed the storage control units to anticipate and present READ data to the client computer at I/O transport speeds. For WRITE operations, the memory cache provided similar performance benefits by allowing the channel interface to be disconnected from the computer immediately upon transmitting the data to the memory cache. The introduction of a "disconnect" allowed the client computer to immediately begin working on other data operations without encountering the rotational and positioning delays writing the data to the disk. The actual write operation of the data was then done "out of band" from client computer connection and at the scheduling convenience of the storage control unit.

Though control unit memory cache provided significant performance improvement in random access reference patterns, it also proved to be a performance advantage in sequential access operations. Schemes for data look-ahead and aggregation of data into larger block sizes optimized the out of band write operations and demonstrated considerable overall performance gains.

In summary, control unit memory cache demonstrated significant performance benefits in comparison to directly accessing the disk storage upon a WRITE DATA request.

One problem however became readily apparent to the designers of the storage control units. The problem was that memory cache introduced potential loss of the data should a failure occur after signaling the host computer that the data was received and written. This occurs due to cost effective Random Access Memory (RAM) being volatile, e.g., the contents are lost if electrical power is lost. In addition to a loss of power, if a control unit cache memory encounters an uncorrectable data error, or a (RAM) memory component failure, the data that was staged to the cache memory but not written to the disk would be lost and thus compromising the accuracy and state of the Host (client) computer data. Loss of the data by a cache memory was a substantial impact to the integrity of the computing operation and was quickly deemed unacceptable by the architects.

Methods were devised to protect data in order to avoid loss due to intermediate residency state in a control unit cache memory. These methods included maintaining a separate mirror copy within each control unit along with a battery backup mechanism. Some companies that developed computers and had fully integrated systems and storage devised even more elaborate schemes to insure a higher degree of availability.

As caching control units became the norm in the industry, the architecture gravitated in providing a mirror copy with battery backup and a data retention mechanism for extended power outage. Consequently, as Mainframe computing has evolved into the Open Systems Client/Server computing, the caching protection methods first devised in the 1970's remain pervasive in the block addressable storage products available today.

As a result, due to the data retention and integrity demands, duplicate memories, battery power, and the resulting complex logic is the common practice for management of storage products provided today.

The architectural "norm" used within the storage industry for client/server configurations is most frequently two control units managing a common storage pool with common mechanical packaging of power and cooling. Most frequently, each of the two control units will mirror its cache memory to the other member via some transport path, be it a common backplane or by channel connection.

In larger configurations, 4 or more control units within an integrated mechanical package with a common storage pool will most frequently share access to a common and mirrored cache memory. This memory cache is equally accessible to all control units within the mechanical package. The underlying cost for four or greater control units sharing a cache memory are higher and are most commonly found in large computing environments where the higher costs can be justified because of greater demands for availability and performance.

In either of the two types of environments described above, the common characteristic is the memory cache being "shadowed" (duplicated) and equally visible by the set of controllers managing the common storage pool. To increase data integrity, associated battery provisions are included to maintain the data in the event of a power loss.

As control units are added to a shared storage pool, the cache memory must expand by a size modulo required for each control unit and provisions made for additive bandwidth access requirements. This is then duplicated (mirrored or shadowed) to provide protection and availability should a component within the cache fail. Finally, the battery power must be sufficient to maintain the memory content integrity over the specified time period.

The method of the duplication or shadowing is not germane to this discussion and known methods may be adopted to use in the present. The end result is that the cost of insuring data integrity and availability comes at additional cost both in component, redundancy, and design complexity.

As shown, the complexity and cost duplicating each control unit's cache memory in the set of control units managing a common storage pool, becomes higher as N is greater than 2. This is true even if a central cache management scheme is used where all control units access a common cache unit maintaining mirror and battery backup.

Within the past decade, additive factors arose as new technologies such as Fibre Channel and "Storage Area Networks" were introduced to block addressable storage. Storage Area Networking (SAN) permits distance and physical separation of the major components that comprise a common storage pool. SAN's were conceived with the ability to provide physically distributed but logically common storage management. SAN's are necessarily different from Network Addressable Storage (NAS) where storage is a remote "mount" file system managed at the file level by some computing intelligence. This intelligence can then use a block addressable storage device as the final storage level but NAS access itself is at a file system basis. Lastly, within recent years there has been a marriage of traditional networking and block level storage vis Internet SCSI (iSCSI). In this transport mechanism, the storage subsystem is a block level addressed system accessed via network protocols encapsulating block level commands. Thus, this disclosure applies to iSCSI storage subsystems and is not limited by the associated transport mechanism. The scope of the present invention is intended to encompass future successors to Internet SCSI (iSCSI) so long as functions remain applicable to such technology.

In summary, in the current time period, bock addressed caching storage subsystems are pervasive in the industry. These caching control units are in turn burdened by the data protection design derived over 3 decades ago. Because of the architectural constraints posed through the centralized concepts for data protection derived in the conventions of mainframe computing of the 1970's, the distributed storage network vision remains compromised by the cost of this convention.

Definitions

The following definitions describe terms used in this disclosure. However, unless specifically stated in claims the invention is not considered to be limited by these definitions. The definitions are provided to merely aid in the understanding of operation of the invention.

To aid in comprehension, the description provided herein may utilize examples operating under the SCSI Fixed Block addressing protocol. However, this invention is also applicable for any mass storage device protocol. Likewise, references may be made to rotating disk devices as the most common storage medium. The present invention is however applicable to any random access device, be it rotating MR/GMR head disk, silicon based storage, or other variants of random access storage. At the time of this patent submission, the predominant storage medium used for data storage is a "disk drive". The term "disk", "disks", or "disk drive" is used through out this document as a generic term to describe the characteristics of random access storage and claims are not considered limited to such rotating disks unless specifically so noted.

For purposes of definition and clarification, an aggregation of disk drive storage devices managed under a block addressable controlling intelligence is defined here as a "storage subsystem." The controlling intelligence is identified as a "control unit." Control units are understood to include a Complex Instruction Set Computer (CISC), Reduced Instruction Set Computer (RISC), or Field Programmable Gate Array (FPGA), which provides a microprocessor based programmed intelligence along with associated memory and I/O transport logic interface devices for interfacing with a host computer(s) and the disk storage units. However, the foregoing description is not considered limiting to claimed subject matter unless expressly stated in the claims and it is understood that one skilled in the art may adopt differing approaches and new technology to accomplish functioning in a control unit sufficient to implement the present invention. Generally speaking, the storage control units are understood to include a central processing unit (CPU) of one form or another to implement the programmed intelligence and associated memory and interface devices for interfacing with a host computer and the storage subsystem.

A term used to describe a total amount of storage managed by the storage control unit(s) is defined here as a "storage pool" which includes the disks, or random access storage devices, controlled by the storage control unit(s) Lastly, this patent submission applies to Block Level Storage Control Unit architecture and is not associated with the data or file structure viewed by Host systems (Computers). Within the computing Operating Systems hierarchy, the file references are translated by some local or remote function (as in the case of NAS) into block addressable command structures issued to the storage control units and including the WRITE DATA being transmitted from the host computer to the storage control unit(s). Hence, the communications between the storage control units ("control units") and the random access storage devices will utilize block level communication protocols to access addressed "sectors" or "blocks" of the disk. It is noted here that the subsystem programmed logics of the storage control units may further translate the addressed "sectors or blocks" identified by the client computing system in to physical destinations unknown by the client system. This "virtualization" of the addressed Block Address issued by the client system is most commonly found in RAID controllers where a set of drives are aggregated into what appears to be a disk device to the client system. This concept is identified as a Logical Unit Number (LUN) and represents further storage management carried out by the controller(s) in protecting data.

The present invention provides a "Logging" concept to protect control unit cached data not yet written to backing storage disk drives, i.e., disk storage or the random access storage devices. In addition to placing the WRITE DATA into the controller cache memory, a storage control unit recording mechanism will copy "WRITE DATA" to a write log in a target external to the storage controller's location. The location is equally common to all members of a set of distributed control units managing a common storage pool. Upon the failure of one the members of the set of control units, "log information" (WRITE DATA and meta-data) is available to a surviving member of the set of control units so as to insure that pending "WRITE DATA" will be retained and written to a proper location on the common disk storage devices upon execution of a recovery action. This is accomplished through an algorithm wherein one of surviving members (not failed) of the set of control units assumes control of storage operations managed and logged by the failing unit; and utilizes recorded information in the write log to insure that data not written to backing disk storage (disk drives) up to the point of failure is then written to the disk storage.

The algorithm of determining which of the surviving members to assume this recovery ownership is not germane to a generalized concept of this invention and, unless otherwise restricted in the claims, the present invention is not considered limited to particular algorithm examples disclosed herein. For example, U.S. Pat. No. 6,820,212 discloses one possible method for detecting a failed control unit and is incorporated herein by reference. The surviving member of the set of control units recovering the failing control unit storage (disk set) ownership will thereby "flush" (WRITE) the WRITE LOG data to the backing storage disk drives before allowing normal operations to proceed.

The term "Journal" and "Journal cache" is used in the balance of the following description as a term to describe the data, meta-data information, and sequential arrival of the logged information. It will be understood by one skilled in the art from this disclosure that there are many approaches that can be used to log the arrival of the WRITE DATA and the meta-data associated with the write operation. The method and format used to record the data and information is not considered limiting to the generalized concept of the invention and the examples provided herein are not considered to limit the present invention unless specifically recited in the claims. However, in order to present an easily comprehensible description of the logged data within this invention, the term "Journal" is used as a descriptive noun to describe a method and a stored record which is readily understandable by the technically astute reader.

The Journal includes control information and Journal entries constructed by each member of the set of control units. The Journal entries are written to a common (external to the storage control units) location. Upon a failure, the information written by the failing member of the set of control units to the Journal is read and used by a recovering member of the set of control units to insure that the backing storage disk drives represent the data content sent to the failing control unit by the host, i.e., client computer, back up to the point of failure.

A Journal Entry contains the client computer WRITE DATA accompanied by meta-data describing the host client computer write request. The meta-data information is created when a member of the set of control units receives a WRITE DATA operation from the host client computer systems the storage control unit manages. More specifically, the storage control unit carries out the meta-data information creating operation during the process of placing the WRITE DATA into a cache memory of the storage control unit, and prior to signaling the host system that the WRITE DATA operation is complete, storing the WRITE DATA and meta-data as a Journal Entry at a location of the Journal. The resulting Journal Entry contains the required information for recovery action to write the WRITE DATA to the backing storage disk drives should a member of the set of control units fail with unwritten WRITE DATA (i.e., unwritten to the backing storage disk drives) remaining in the cache memory of the failing control unit.

The location of the Journal location is logically external to the set of control units managing a common storage pool of to the backing storage disk drives. The set of control units is defined herein as an N-way set where N is greater than 1.

In an exemplary embodiment, the Journal is stored via a common transport interface of the N-way set as to block addressed storage target device, also referred to herein as the "Journal storage device." In a still further embodiment, each of the backing storage disk drives control unit nodes has an individually addressed storage target within the Journal storage device. The Journal Storage Device will contain the copy of WRITE DATA from the storage control unit data cache as well as the Meta Data information describing the attributes of the WRITE operation.

In the above example, the external location of the Journal, frees each controller from maintaining a secondary duplicate cache memory which mirrors READ and WRITE cache memory of another controller within the N-way set of controllers. Hence, an embodiment of the invention is that each controller maintains only one copy of the WRITE data within its' cache memory and no other controller is required to maintain a duplicate or mirror copy of another storage control unit's cache memory. Thus WRITE DATA is cached in only the immediate control unit and the duplicate copy is issued to the Journal storage device as a back-up preferably without being sent to cache memories of other control units. By not being required to maintain the mirror copy of the WRITE data in a cache of another one of the storage control units (a control unit cache), the other members of the N-way set of control units are not burdened by the associated overhead in bus and memory traffic or in associated exception management.

The present invention provides, but is not required to provide, a reduction in both cost and complexity is reduced as the number ("N") of controllers increases beyond 2.

The present invention permits, but does not require, individual members of the storage control unit set to be physically located (dispersed) across a wide geography of the storage network.

Through this invention, control units do not require the traditional costly and complex centralized cache management.

Through this invention, only the outstanding WRITE data not written to disk (backing storage), i.e., to the backing storage disk drives, is contained and managed at the Journal location obviating the space required for storing READ DATA in the Journal. As noted above, such READ DATA may be maintained in a cache of a control unit.

Through the present invention it is feasible, though not required, that any member of the set of controllers can assume recovery responsibility for the LUNS and disk storage managed by the failing control unit even though physically distant from the failing control unit and Journal location. More specifically, an example of this advantage is that the member of the set is not required to share common backplane and packaging with other members of the set.

This invention permits the simplest case for a control unit memory cache to be used, a single controller with a memory cache requiring no additional provision for cache duplication or battery backup power. In a preferred embodiment of the present invention battery backup of write data is only required in the external Journal Cache location if it uses a volatile memory for storage.

Through this invention, and contrary to conventional storage subsystems maintaining a shadow copy on other control units, this method of Write Data replication will, in the general case of external caches wherein two control units must exchange write data, require bandwidth from one control unit only, i.e., a source of the replication which is the storage control unit which received that WRITE DATA request from the host computer, or a control unit at least finally assigned to the WRITE DATA request.

By maintaining space and availability provisions for only the WRITE data not written to disk, the total overall memory size of the Journal Cache is lessened in comparison to a mirror cache with all data, both read and write data being maintained (as a mirror copy) therein. This allows the associated manufacturing cost of a control unit utilizing the present invention to be reduced by a linear factor as "N" is greater than 2.

The present invention makes possible that the storage control units of a set can be physically separated by large distances not requiring a close connection or common backplane for common cache memory access.

By use of the Journal Cache, the storage control units are able to provide the distributed intelligence, in an exemplary embodiment, through use of technology advancement provided by Storage Area Networks.

The present invention provides that, where the number (N) of control units is N=2, and a control units fails, the external Journal storage device via a common access path allows the surviving control unit to continue using Write Cache operation. Should the surviving control unit fail, the outboard Journal storage device is unaffected and is available for recovery of any written data upon the restart of a control unit. Should the Journal device fail, the surviving control unit can engage in its main cache flush and operate in direct WRITE DATA pass through mode.

Briefly state, the present invention provides a "Logging" method and apparatus to protect storage control unit cached data not yet written to backing storage disk drives. This recording mechanism will copy "WRITE DATA" to a log at a target logically or physically external (to the storage controllers) location equally common to all members of the set of distributed storage control units managing a common storage pool. Upon the failure of one the members of the set of control units, the "Log" information is available to insure that pending "write" data is written to the proper location on the disk drives upon a recovery action. One of the surviving members of the set assumes control of the storage managed by the failing unit by utilizing the recorded information to insure that data not written to backing storage (disks) up to the point of failure is then written to the disk backing storage. The surviving member of the set recovering the failing control unit storage (disk set) ownership will thereby "flush" (WRITE) the Journaled WRITE DATA to the backing storage disk drives before allowing normal operations to proceed.

The present invention provides a method and apparatus embodiment for reducing bandwidth requirements in a storage system including backing storage and which is used by a client computer system, including providing a storage control unit connected to the client computer system and the backing storage, and the storage control unit being configured to receive write requests to transfer WRITE DATA received from the client computer to the backing storage using block level addressing protocol, providing a journal memory storage device logically and/or physically external to the storage control unit, and providing data structures within a memory of the storage control unit configuring the storage control unit to determine a next journal address and space available in the journal memory storage device for a journal entry and WRITE DATA to be written. The storage control unit is configured for receiving in the storage control unit, from the client computer system, a write request to the storage control unit to store WRITE DATA, and in response thereto operating the storage control unit to perform the journaling and data operations. Included in the operations are: storing WRITE DATA into a control unit cache memory contained in the storage control unit; creating, for storing in a journal entry in a journal log in the journal memory storage device, a journal entry meta-data identifying at least a LUN, address, and length for the WRITE DATA, said journal log being associated with the storage control unit; identifying, in the journal entry meta-data, position information detailing WRITE DATA attributes and arrival information of the Write Request for the WRITE DATA; storing header information in the journal memory storage device within a header descriptor of the journal log, the header information storing an "oldest written" and a "most recent written" cache entry of the WRITE DATA stored in the storage control unit cache memory, a first available address for entry of the journal entry meta-data and the WRITE DATA in the journal log, space available in the journal, and a time of last write to the backing storage; writing the journal entry including the WRITE DATA and the meta-data to a selected device location and block address of the journal memory storage device; upon completion of the writing the journal entry, returning an ending status to the client computer system without having written the WRITE DATA to a cache memory in another control unit and without another control unit having processed the WRITE DATA to form a cache entry; performing a data flush which writes the WRITE DATA from the write request of the client computer system stored in the storage control unit cache memory to the backing storage; and upon completion of said performing a data flush, updating status fields of the header information reflecting the data flush status to allow eventual re-use of an oldest journal entry location.

A further feature of an embodiment of the above describe invention is that said providing a storage control unit includes providing a plurality storage control units each configured to effect said journaling and data operations, each of said storage control units being connected to at least one client computer system and the backing storage, and the storage control units being configured to receive write requests to transfer WRITE DATA received from the client computer to the backing storage using block level addressing protocol, the storage control units each having access to said journal memory storage device.

Another feature of an embodiment of the above describe invention is that wherein failure of one of the storage control units occurs in a failed storage control unit and a recovery storage control unit of the storage control units addresses the failure, the recovery storage control unit is configure to effect the following operations: detecting failure of the failed storage control unit; selecting the recovery storage control unit; a reading process operating the recovery storage control unit to identify and read a journal log associated with the failed storage control unit; a flushing process operating the recovery storage control unit to flush un-flushed data, of the WRITE DATA stored in the journal log associated with the failed storage control unit, to the backing storage; an assumption process operating the recovery storage control unit to assume functions of the failed storage control unit. The assumption process includes: accepting write requests from the client computer system previously handled by the failed storage control unit; writing received WRITE to portions of the packing storage associated with the failed storage control unit; and performing said journaling operations associated with the write requests from the client computer system previously handled by the failed storage control unit including defining a journal log associated with such write requests in the journal memory storage device.

A feature of embodiments of the above describe invention is that wherein power loss shuts down one of the storage control units, said one of the storage control units is configured to execute the following power loss recovery process initiated with power on of said one of the storage control units: querying said header information for indication of an uncontrolled power off condition; flushing to the backing storage WRITE DATA from the journal entries starting at an oldest entry not written journal entry, and progressing forward until a most recent not written journal entry if an uncontrolled power off condition is indicated; and initializing said header information on the journal memory storage device to a starting state.

A further feature of the above noted embodiment is that said flushing to the backing storage WRITE DATA comprises: identifying said journal memory storage device and said header information associated with said one of said storage control units; obtaining said header information; obtaining an address of said oldest not written journal entry and said most recent not written journal entry; and sequentially obtaining WRITE DATA disk address for each journal entry and writing said WRITE DATA of the journal entry to the backing storage starting at said oldest not written journal entry and ending at said most recent not written journal entry, wherein said flushing is executed without accessing a cache memory of another one of said storage control units.

Another feature of embodiments of the above describe invention is that said journal memory storage device has a faster response time than said backing storage and is one of non-volatile and backup battery supported.

Yet another feature of embodiments of the above describe invention is that the journal memory storage device is a plurality of SSDs located physically external to the storage control units.

A further feature of embodiments of the above describe invention is that said storage control units do not provide mirror caches to others of said storage control units.

A still further feature of embodiments of the above describe invention is that said journaling operations do not require overhead operations of ones of said storage controllers other than a respective one of said storage controllers performing the journaling operations.

Another feature of the present invention is that said client computer system includes a plurality of client computer systems, and said client computing systems perform caching operations at file system structure levels independent of said storage control units and the caching operations are independent of operation of the storage control units.

The present invention includes the apparatuses and systems described above and herein, the method described above and herein by which the apparatus works, and memory devices or mediums storing executable code for effecting the method by configuring storage control units.

The above, and other objects, features and advantages of the present invention will become apparent from the following description read in conjunction with the accompanying drawings, in which like reference numerals designate the same elements. The present invention is considered to include all functional combinations of the above described features and is not limited to the particular structural embodiments shown in the figures as examples. The scope and spirit of the present invention is considered to include modifications as may be made by those skilled in the art having the benefit of the present disclosure which substitute, for elements or processes presented in the claims, devices or structures or processes upon which the claim language reads or which are equivalent thereto, and which produce substantially the same results associated with those corresponding examples identified in this disclosure for purposes of the operation of this invention. Additionally, the scope and spirit of the present invention is intended to be defined by the scope of the claim language itself and equivalents thereto without incorporation of structural or functional limitations discussed in the specification which are not referred to in the claim language itself. Still further it is understood that recitation of the preface of "a" or "an" before an element of a claim does not limit the claim to a singular presence of the element and the recitation may include a plurality of the element unless the claim is expressly limited otherwise. Yet further it will be understood that recitations in the claims which do not include "means for" or "steps for" language are not to be considered limited to equivalents of specific embodiments described herein.

DETAILED DESCRIPTION

In accordance with the present invention, an exemplary embodiment thereof is herein set forth. Diagrams are provided below in accompanying figures which show certain preferred embodiments of the present invention as described herein. The specifics and content of a Journal Entry are not germane to limiting the scope of the present invention, but are merely presented as an exemplary embodiment, which is not limiting unless specifically referenced in the claims. Hence, one skilled in the art may adopt other forms of Journal Entry yet not depart from the scope and spirit of the present invention unless so excluded by specific claim language.

Figure 1:
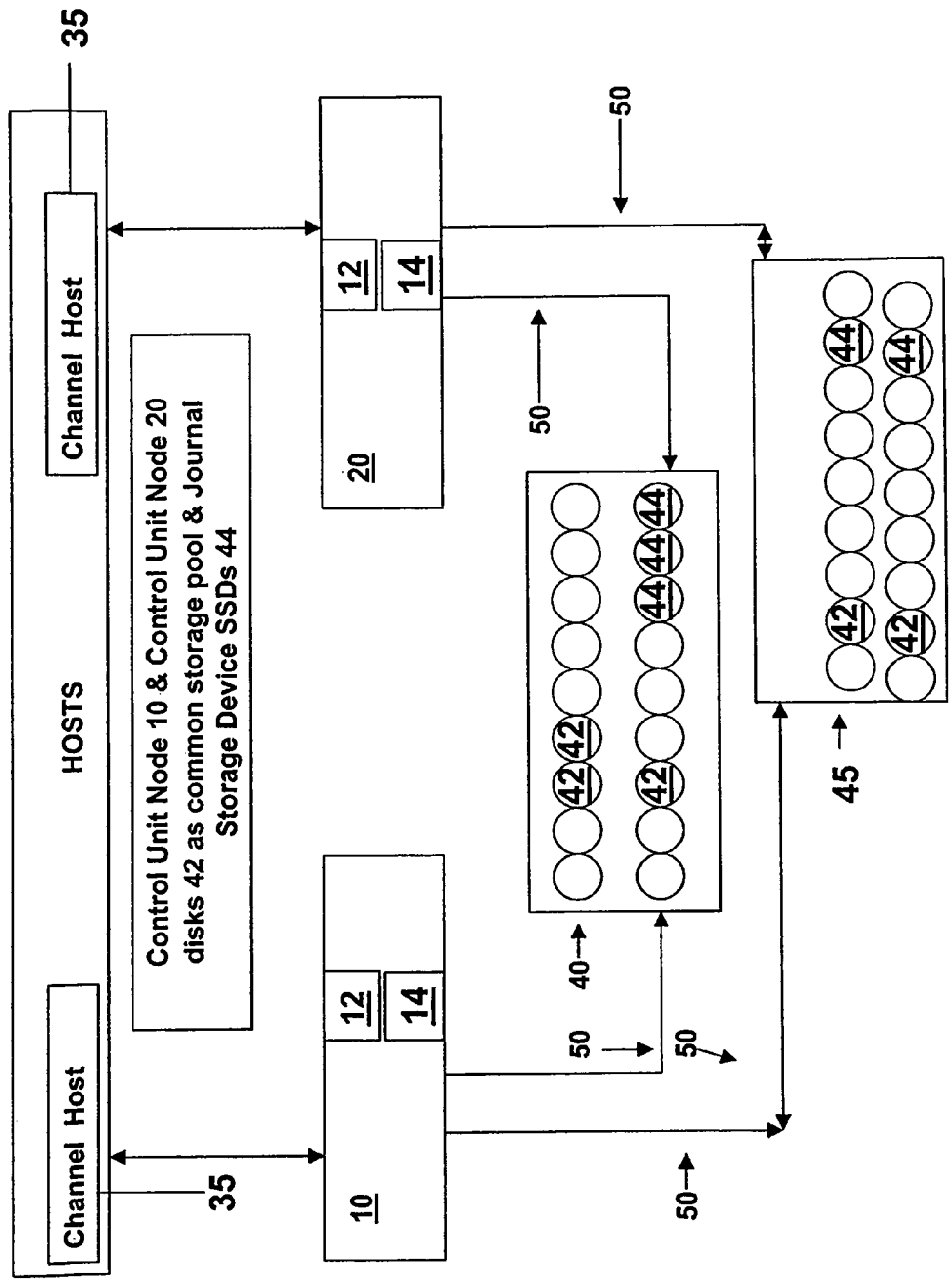
FIG. 1 is a block diagram of an embodiment of a system for implementing the present invention.

Referring to FIG. 1, control units 10 and 20 each include a CPU 12 and memory 14 for effecting control unit operation. The memory 14 is shown as a single unit but may be divided into separate partitions accessible by the CPU 12. Included in the memory 14 is a cache memory for storing WRITE DATA, READ DATA and meta-data associated with requests from a host computer or computers 35 connected to the storage control units 10 and 20 via a Block Addressable SAN transport. For simplicity, a single host is shown but it is understood that the storage control units 10 and 20 may service a plurality of hosts. It is further understood that the present invention may include further control units and that two control units are shown merely for simplifying disclosure of the present invention. The two control units 10 and 20 are shown as physically separated, and the separation distance is dictated by the SAN transport technology. For example, such transport technology may optionally be ANSI standard Fibre Channel.

Disk enclosures 40 house a plurality of disks 42 and a plurality of Journal storage devices 44. Furthermore, additional disk enclosures may exist, such as a further enclosure 45, and may be on proximity to one another or may be distributed physically apart from one another and interfaced over a network. The number of disk enclosures is not considered limiting to the invention and and is dictated by the transport technology capability as well as the total capacity usage required for the operations environment.

In the present invention example shown in FIG. 1, the Journal storage devices 44 are storage devices which will retain data upon loss of utility power through an appropriate mechanism. In the following example application of a preferred embodiment, the Journal storage devices 44 are identified as Solid State Disk[1] devices (SSD). The SSD's are optionally combined into a RAID group form to form an appropriate and robust storage space for storage of the Journal described as the present invention. Note that SSD's are memory devices that emulate a rotating disk without any actual rotational latency. For purpose of the example, the SSD devices maintain data integrity with built-in battery data retention for some period of time. The use of SSDs in the practice of the invention is not considered limiting unless state in the claims. The scope and spirit of the present invention is not considered limited to SSD use, and is intended to encompass other present day and future developed storage technologies which serve to function in a consistent with implementation of the present invention as described.

As previously described as an option of the present invention, and this embodiment form, the SSD storage devices are combined into a RAID group. The Journal storage device 44 is shown as the SSD units within the enclosures 40 containing the plurality of disk drives 42 as well as the plurality (set) of SSDs, all devices being commonly connected to the storage control units 10 and 20. For this example, the SSDs are organized into a RAID group of the Journal storage devices 44 within the disk enclosure 40 and Journal data will be written across the Journal storage devices 44 in accordance with RAID techniques known to those skilled in the art to form an SSD RAID group.

Still further, the SSD RAID group is parsed into uniquely addressed LUN's, at least one LUN for each member of the set of control units, 10 and 20, managing a common storage pool formed of the disks drive 42. Each SSD LUN becomes a Journal storage target and storage space associated to one of the storage control units, 10 and 20, as the location for its respective Journal. Throughout this disclosure the term Journal storage device is used singularly and plurally with the understanding that one or more storage devices may be employed and such use is not considered limiting.

In the embodiment shown in FIG. 1, the storage control units, 10 and 20, are interfaced with the disks drive 42 via a Fibre Channel (FC) interface, however, other interfaces such as SCSI, Infiniband, or SAS, may be used either in host 35 or disk 42 and Journal Storage Device 44 connection. Additionally, the present invention is intended to include use of future interfaces which provide the attributes and characteristics of a Storage Area Networks functionality found in Fibre Channel interfaces.

The Journal for each of the storage control units, 10 and 20, may be maintained via many other forms, however the SSD LUN device embodiment provides an easily comprehended mechanism for Journal data to be stored with minimal latency and comparable bandwidth to that of conventional mirror cache mechanisms which is preferably better than the disk drives 42. Lastly, as shown in the SSD use embodiment, the SSD units contain an internal battery for memory retention in power loss. This is not required if the memory is non-volatile.

It is noted that in this example embodiment, the Journal shares the same bandwidth and latency attributes as control units utilizing Fibre Channel connection for conventional mirror caching. One outcome of this example embodiment is a possibility that as Journal bandwidth is reduced and latency delays increased, the client WRITE Operations approach and can exceed the same transfer rates as that of directly accessing the disks 42.

One distinction here between conventional mirror caching and Journal "caching" is that the Journal is housed in the Journal storage devices 44 which are, in this example embodiment, physically external to the set of control units 10 and 20. Thus, with this invention, the Journal can be physically dispersed as in the example of FIG. 1, or alternatively simply logically separated by physical boundaries where the Journal location shares the same mechanical packaging as respective members of the storage control units 10 and 20.

Thus, while the example embodiment of FIG. 1 shows the Journal storage devices 44 in the disk enclosures 40, the Journal storage devices 44 may be housed in adjacent mechanical housings of the respective disk controllers 10 and 20 provided that each of the disk controllers 10 and 20 have access to the other's Journal storage device 44 to permit recovery in the event of a failure of a given one of the disk controllers 10 and 20. Where separation is physical as oppose to merely logical, the Journal storage devices 44 preferably rely upon appropriate high speed data transport technologies to maximize bandwidth and provide low latency, examples of such technologies are Infiniband, Fibre Channel, Serial Addressed SCSI and high speed networks supporting block addressable protocol.

Figure 2:
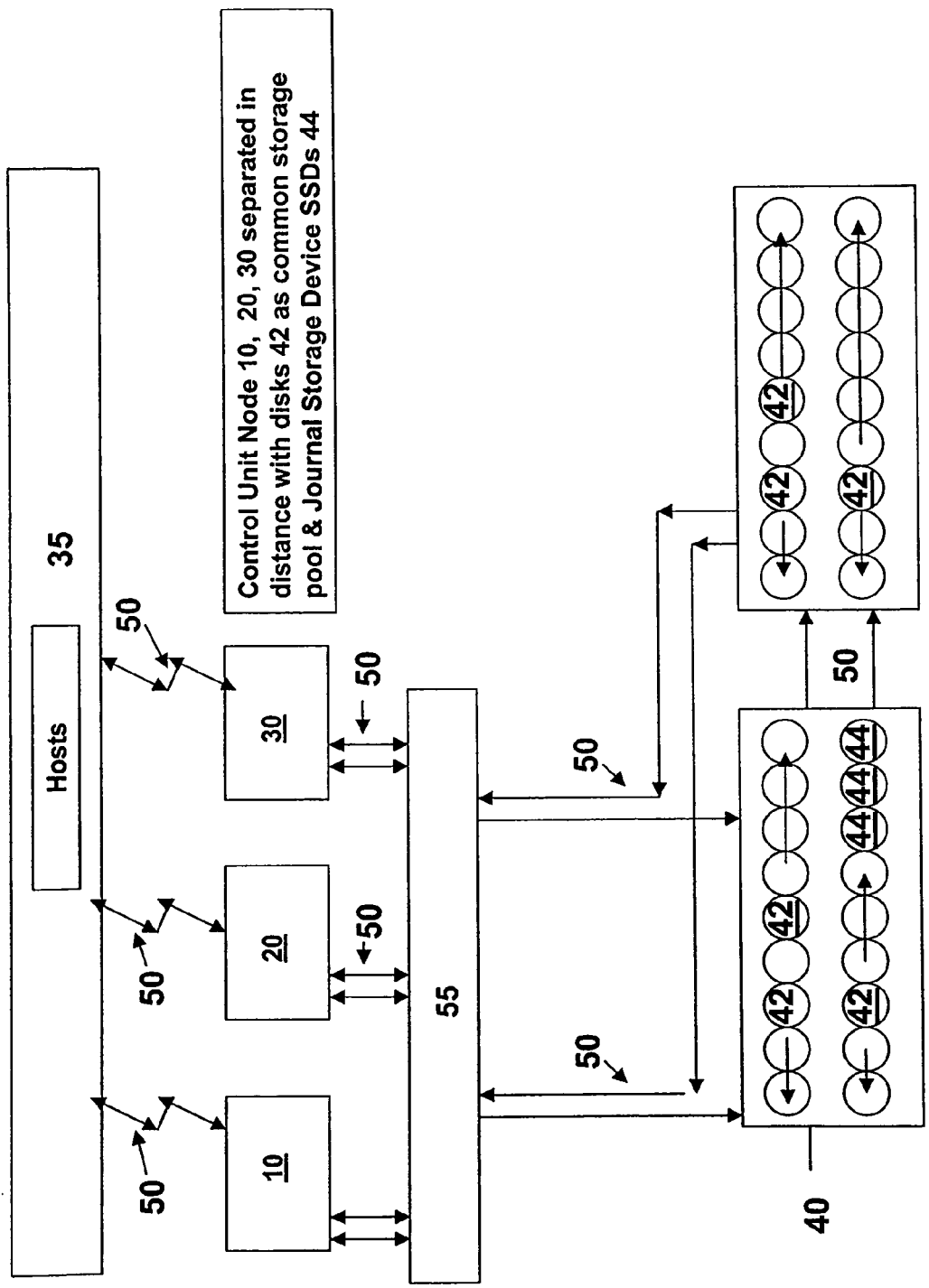
FIG. 2 is a block diagram of another embodiment of a system for implementing the present invention.
Figure 3A:
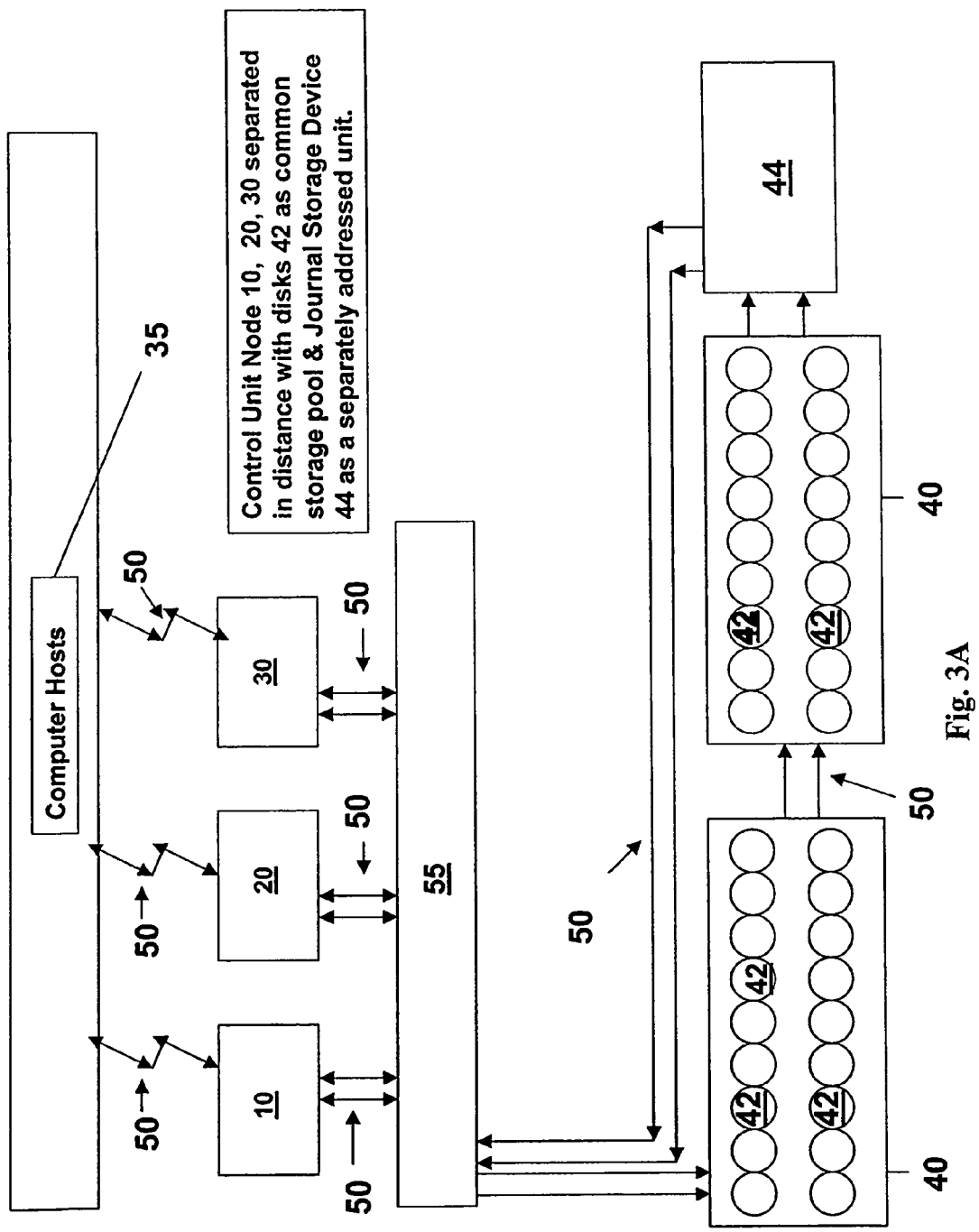
FIG. 3A is a block diagram of still another embodiment of a system for implementing the present invention.
Figure 3B:
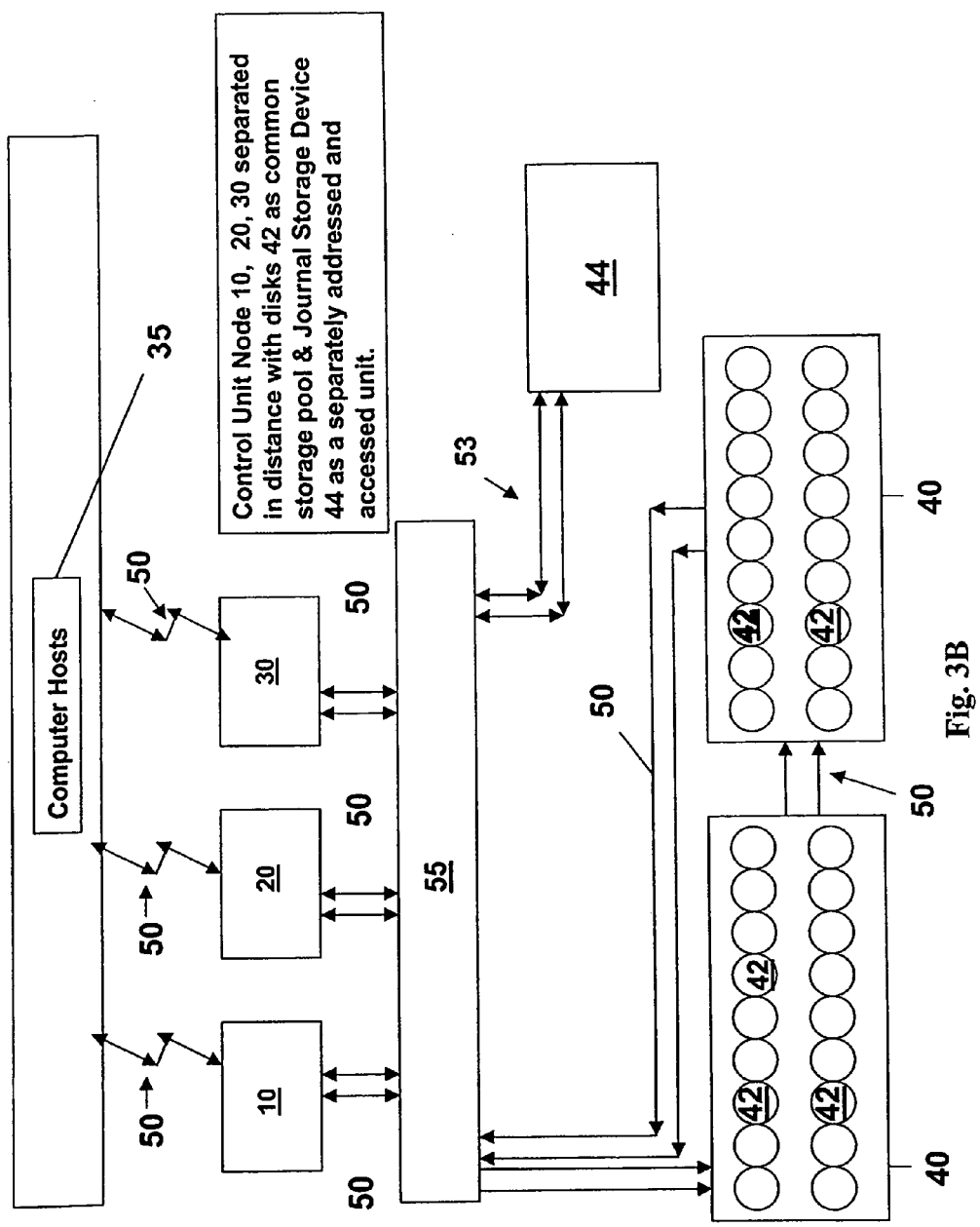
FIG. 3B is a block diagram of yet another embodiment of a system for implementing the present invention.

Referring to FIG. 2 a configuration is shown wherein three control units (N=3), 10, 20 and 30 share a common storage pool of disks 42. The three control units 10, 20 and 30 are shown as physically separated across the distances permitted by Fibre Channel connections 50 and via Fibre Channel switch 55. It is understood that although only for purposes of simplicity two disk enclosures 40 are shown, further disk enclosures 40 may be used wherein each optionally house a Journal storage device 44 for further redundancy. Additionally, depending on the sizes of the Journal storage devices 44, each disk enclosure need not necessarily house a Journal storage device 44 provided that the total storage capacity of the Journal storage device 44 present is sufficient for Journaling of the WRITE DATA and associated meta-data. Furthermore, referring to FIG. 3A it is understood that while the Journal storage devices 44 referenced above are each shown associated with respective ones of the disk enclosures 40 the Journal Storage Devices 44 need not be and may be housed separately provided that each of the controllers 10, 20 and 30, have access to the Journal storage devices 44 as shown in FIG. 3A or as a separate and specialized Journal Storage Device as shown in FIG. 3B wherein connections 53 interconnect the storage control units 10, 20 and 30 with the Journal Storage Device 44. Hence, it is understood that the present invention may be expanded to include a plurality of controllers not necessarily limited to two or three, i.e., N, the number of controllers may be greater than three.

Figure 4:
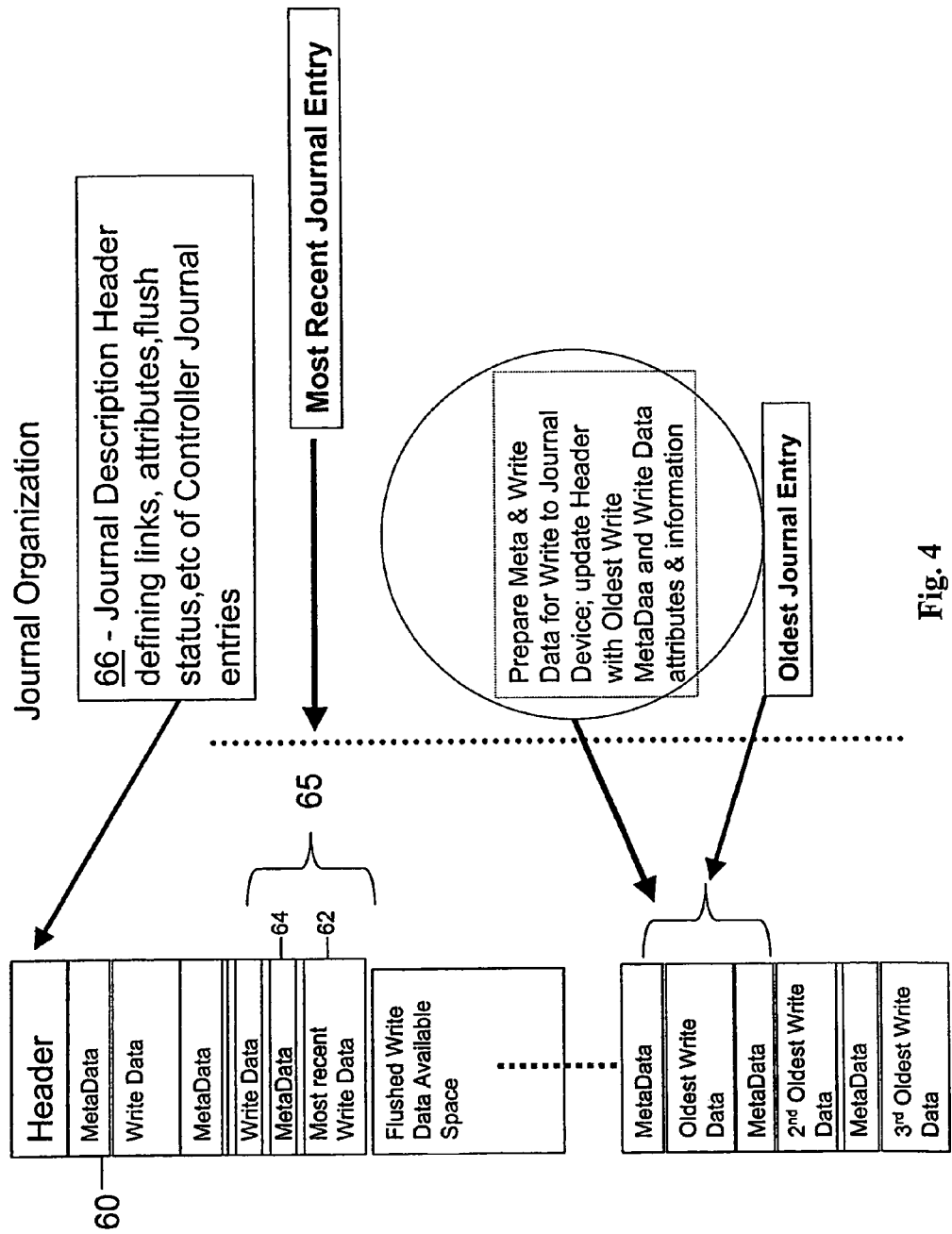
FIG. 4 is a diagram representing an embodiment of a configuration of a Journal log of the present invention.

Referring to FIG. 4, an example of an embodiment of a Journal log 60 of the present invention is shown. The Journal 60 (shown as an address space for one member of the set of control units 10, 20 and 30) is stored in the Journal storage device 44 appropriate for that control unit. As previously identified, the actually storage of the Journal 60 is preferably placed in fault tolerant high availability Journal storage devices 44, and whether RAID is used is an optional implementation. However the Journal Storage Device 44 is implemented, it must be highly available and accessible by all client computers in the set of control units 10, 20 and 30 such that it allows recovery of the Journal 60 in the event of failure of one or more of the set of control units 10, 20 and 30. A high level description follows of a Journal cache protection application method and apparatus of the present invention.

In the practice of the concept of the present invention, a particular method used to determine a Journal Entry containing the first instance of "data not written to disk" is an implementation detail and not limiting to the broad invention concept unless specifically stated in the claims. Nevertheless, the following details an approach taken to implement the present invention and is considered to be one of several possible avenues to implementation of the present invention. In light of this disclosure, those skilled in the art will recognize other avenues which are considered within the scope of the present invention. The following implementation is thus one particular embodiment of the present invention.

Sufficient information is required to identify a WRITE DATA event and command specifics thereof for storing WRITE DATA on the backing storage disk drives, i.e., FIGS. 1-3 disks 42, and association of the WRITE DATA to data in the storage control unit cache memory 14 in the FIG. 1 of the respective one of the storage control units 10 and 20. Thus, in FIG. 4 when the storage control unit 10 receives WRITE DATA 62 from a host 35 the storage control unit 10 prepares meta-data 64 containing the information required to identify a WRITE DATA event and command specifics thereof. Operation of the storage control unit 10 of FIG. 1 is depicted on the right side of FIG. 4. The meta-data 64 is then stored along with the HOST DATA 62 in the Journal log 60 as a Journal Entry 65 by the storage control unit 10. In depiction of a circular nature of the Journal log 60, older entries are shown on the bottom and a most recent entry is shown in the Journal Entry 65. The storage control unit 10 maintains a cache control block description 66 at the head of the Journal address space. This control block provides the necessary links, length, attributes and flush status of the log entries 65 in the associated controller cache memory 14 shown in FIG. 1.

There are a number of Journal methods available to identify a first applicable Journal Entry in the event of a failure of one of the associated control unit, (either 10 and 20 in the FIG. 1 example embodiment), that is, where to begin in a write (flush) of data from the Journal 60 of the invention to the backing storage disk drives 42 which are not necessarily limiting to the invention. One example embodiment is maintenance of clock information along with the MRU (most recently used) and LRU (least recently used) information.

Journaling Operation

Figure 5:
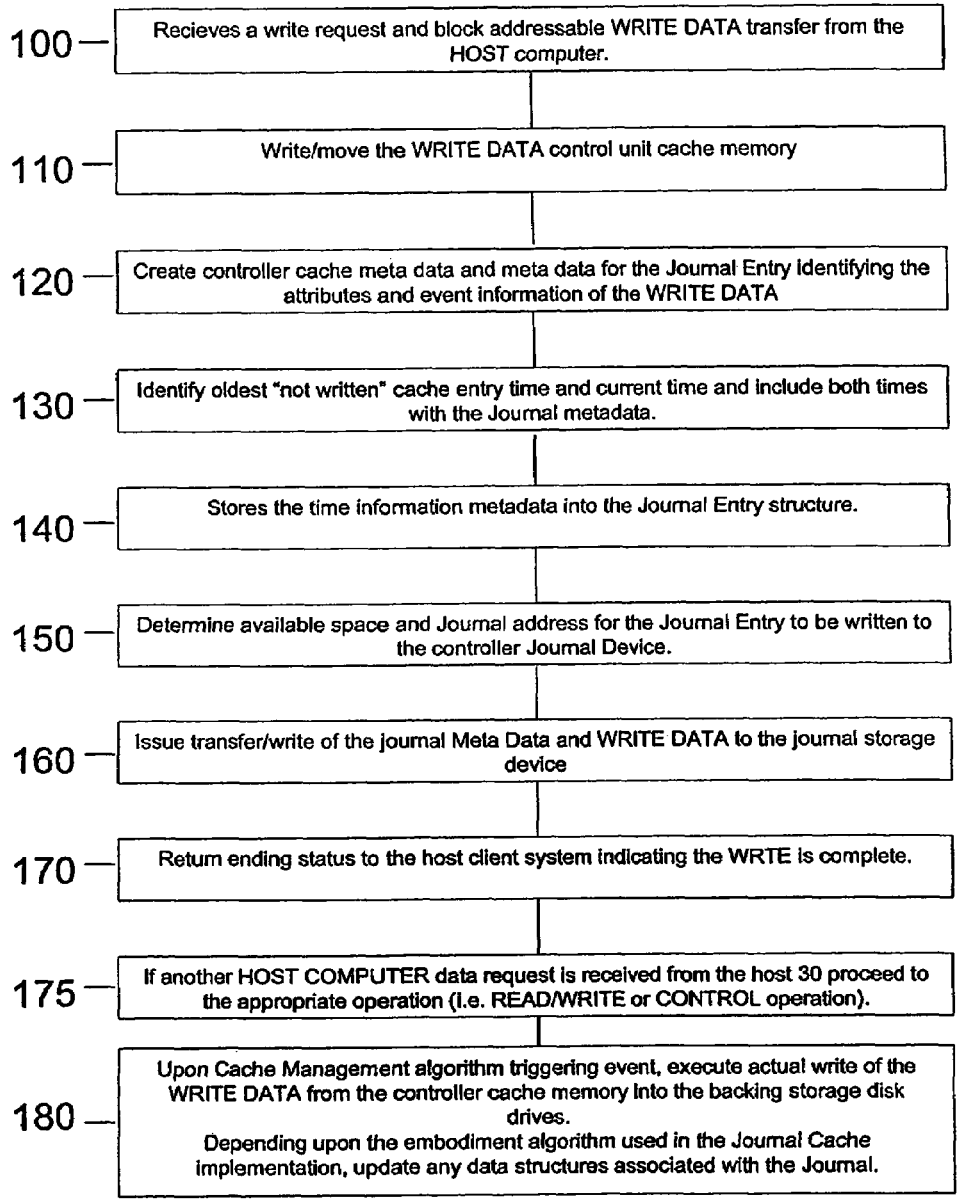
FIG. 5 is a flow chart illustrating an embodiment of a method for implementing creation of a Journal log of the present invention.

Referring to FIG. 5, a flow chart depicts operation of the storage control unit 10 upon receipt of a client write request. At step 100, the storage control unit 10 receives the write request and WRITE DATA 62 from the HOST 35. Next, in step 110, the storage control unit 10 writes the WRITE DATA 62 to the storage control unit cache memory 14. Following writing the WRITE DATA to the cache memory 14, the storage control unit 10 of FIG. 1 creates (FIG. 4) meta-data 64 for the Journal Entry 65 which identifies all active attributes for the Write Operation from the Host computer 35 in step 120. Furthermore, in this example embodiment, the storage control unit 10 identifies an oldest "Not Written" cache entry time and the current time and includes this information in the meta-data 64 in step 130. Having completed preparation of the meta-data 64, the storage control unit 10 transfers the information into a Journal Entry 65 in the storage control unit cache 14 in step 140. Next, in step 150, the storage control unit 10 determines a Journal address and location in the Journal Storage device 44 for the Journal Entry 64 to be written along with the host computer 35 WRITE DATA 62. The storage control unit 10 then, in step 160, writes the Journal Entry 65, including the WRITE DATA 62 and the meta-data 64 for the WRITE DATA 62, in the Journal log 60 in the Journal storage devices 44 via the transport and protocol implemented for the Journal Storage Device 44. As noted above, in order to reap advantages of the present invention, the Journal storage devices 44 are very highspeed devices with either nonvolatile storage medium or some form of battery backup combined with very high speed transport that can perform writes faster than the backing storage disk drives 42. Upon completion of the Journal Entry write, the storage control unit 10 returns amending status to the host client 30 indicating that the write reception has been completed in step 170. Thus, the host client 30 can proceed with other operations without experiencing a delay associated with either a duplicate write to an adjacent controller cache memory 14, or an actual write of the WRITE DATA to the backing storage disk drives 42. The storage control unit 10 will next check in step 175 to see if other host 35 requests are received from the host 35. As is true of a traditional block addressable disk cache mechanism, the algorithms use for aging cached WRITE data will trigger the storage control unit to execute the actual write (flush) of the WRITE DATA 62 from the cache memory 14 into the backing storage disk drives 42 in step 180. Since the WRITE DATA 62 from the host client 35 has been saved both in the cache memory 14 of the storage control unit 10 and also in the Journal 60 stored in the Journal storage device 44, it is assured that even in the event of failure of the storage control unit 10 before an actual write (flush) of the WRITE DATA 62 from the cache memory 14 to the backing storage disk drives 42, the WRITE DATA 62 is retained in the Journal storage devices 44 and will be eventually written to the backing storage disk drives 42 by a surviving controller as part of failover responsibilities. Writing minor cache data to another cache memory of another control unit 20 or 30 is thus obviated.

Following completion of the write of host 35 data 62 to the backing storage disk drives 42 in step 180, the storage control unit 10 proceeds to update status fields reflecting the data flush status to allow eventual reuse of the oldest Journal Entry slots. In some instances, if a finite capacity of the Journal storage devices 44 fills-up fast, the storage control unit 10 may preempt WRITE DATA operations so as to insure the Journal Entry available space. Having noted this (remote) possibility it is noted that cache management algorithms have long dealt with maintaining available space and such logic will likewise be applicable for the Journal management and thus details are not presented as one skilled in the art will be able to provide implementation.

Further, the WRITE DATA 62 is only processed by one of the storage control units 10, 20, or 30 to which the WRITE DATA 62 is directed by the host 35 prior to being written into the Journal Storage Device 44 and remains as such until flushed by the storage control unit 10, 20 or 30, which wrote the WRITE DATA 62, or until the storage control unit 10, 20 or 30 that wrote the WRITE DATA 62 fails at which time a surviving one of the storage control units 10, 20 or 30, with access to the WRITE DATA 62 will proceed to store it. The WRITE DATA 62 remains as written by the storage control unit which first writes the WRITE DATA 62 to the Journal Storage Device 44, and other ones of the storage control units 10, 20 or 30 do not alter or correct the WRITE DATA 62 prior to a cache flush to backing storage by the storage control unit which wrote the WRITE DATA 62 to the Journal Storage Device 44. Thus the logs of Journal Storage Devices 44 do not serve as a storage devoted to data comparison operations or other data altering operations.

Power Loss Operation—Log Recovery

Figure 6:
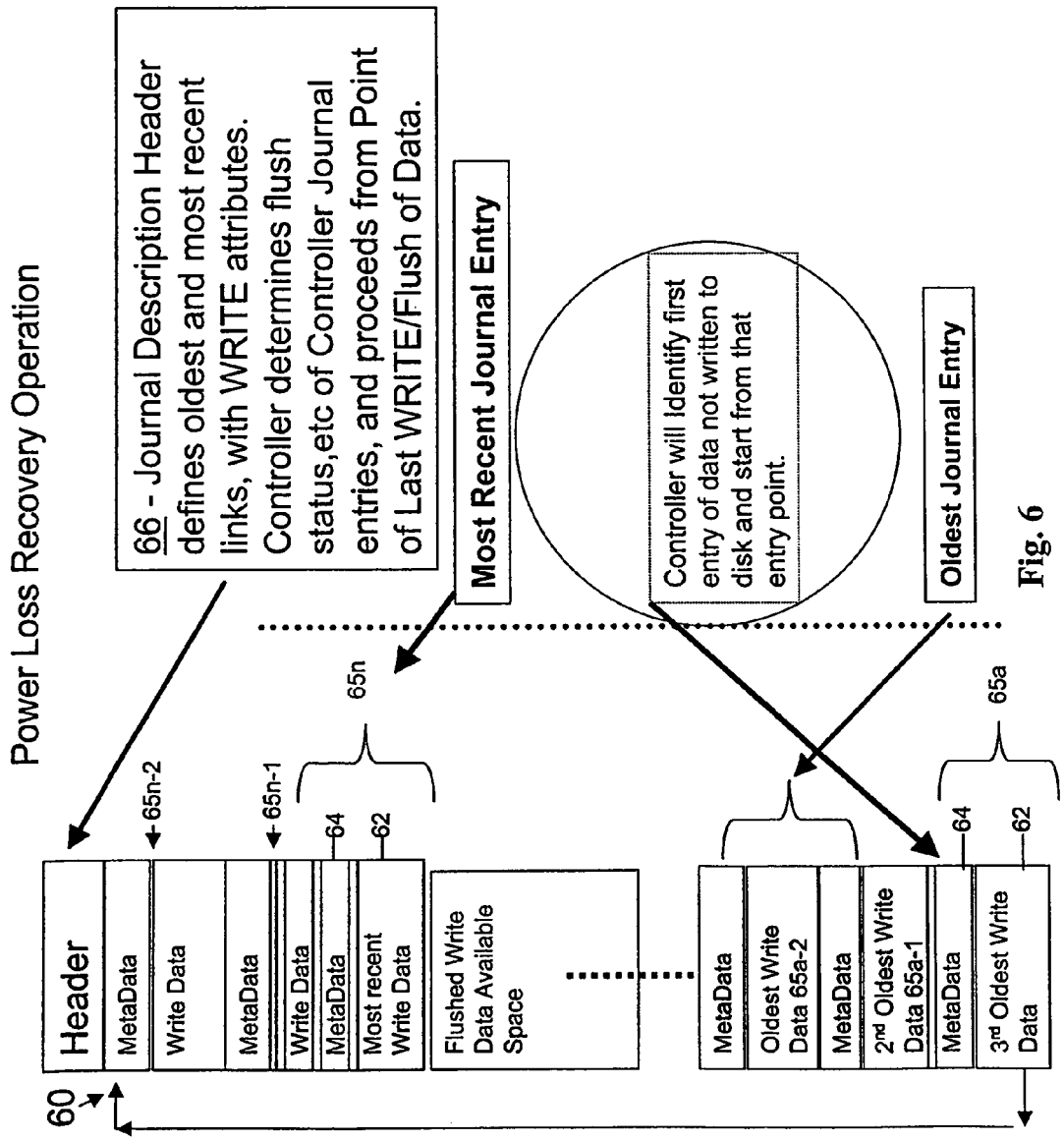
FIG. 6 is a diagram representing an embodiment of a configuration used in implementing a recovery operation using the Journal log of the present invention.

Referring to FIGS. 5 and 6, upon loss of power and re-establishment of power the example embodiment of the storage control unit 10 executes a recovery process upon power on initialization. At the power on initialization, the initial state of the storage control unit 10 cache memory 14 is in an indeterminate and invalid state. Upon entering the power on state, the storage control units 10, 20, will query the Journal Storage Device 44 for their respective Header 66 information and indication of a controlled or uncontrolled power off condition. Upon reading the Header 66, if the storage control unit 10 determines an uncontrolled power down state was present, the storage control unit 10 (and 20), the storage control unit 10 will enter a self initiated recovery process to flush the WRITE DATA 62 from the Journal entries starting at an "oldest entry not written" entry, and progressing forward till a "most recent" entry in encountered. Upon completing the flush of journaled WRITE DATA 62, the Journal Header data structure 66 on the Journal Storage Device 44 as well as the controller 10, 20 data structures for managing the Journal will be initialized to a starting state. If on power up status, the controllers 10, 20 determine there are no outstanding WRITE DATA entries 65 due to controlled shutdown, the controllers 10, 20 will initialize the respective controller cache 14 and Journal Header 66 data structures to a respective starting state. While the controller 10 is referred to herein, it is understood that the other controllers 20 and 30 will function similarly.

In an example embodiment of the Power On initialization process, the storage control unit 10 identifies the Journal Device 44 and Header 66 location associated with the storage control unit 10 in step 300. In step 310 the storage control unit 10 obtains the associated header block 66 of the Journal 60. The storage control unit 10 next, in step 320 obtains an address of an oldest entry, and a most recent entry, and through the caching algorithm used determines an oldest entry not written to disk.

From that point, the central unit 10 in step 330 reads the associated meta-data 64 of the "oldest entry not written to disk" in the Journal 60 associated with the controller 10 from the Journal storage devices 44. From there, it obtains the WRITE DATA disk address and attributes and issues the WRITE DATA 62 to the backing storage 42. The central unit 10 in step 335 then updates the data structures of the header block 66 with information indicating current status of WRITE DATA 62 in step 330. This process is iterated as indicated in step 340 until reaching the most recent entry and then the storage control unit 10 completes power on recovery, initializes the Journal State and opens access to the hosts 35 in step 350. As shown, during the Power On Journaling Recovery Operation shown in FIG. 5, once the "oldest entry not written" is determined, each Journal Entry 65 thereafter is sequential in the Journal 60. The particular implementation for determining the last WRITE DATA from the controller 10, 20 cache memory 14 to the backing storage 42 prior to the uncontrolled Power Off event is not limiting to the invention unless so stated in the claims. Such algorithmic mechanisms dealing with the appropriate Journal entry maybe are in accordance with Journal techniques known to those skilled in the art or in accordance with the algorithm prescribed below.

Referring to FIG. 6, the Journal 60 is shown and Journal Entries 65a through 65"n" are depicted entries which have not yet been written to the backing storage 42. Journal Entry 65a-1 and older entries were already written to the backing storage 42 by controller 10 prior to the uncontrolled shut down.

Figure 7:
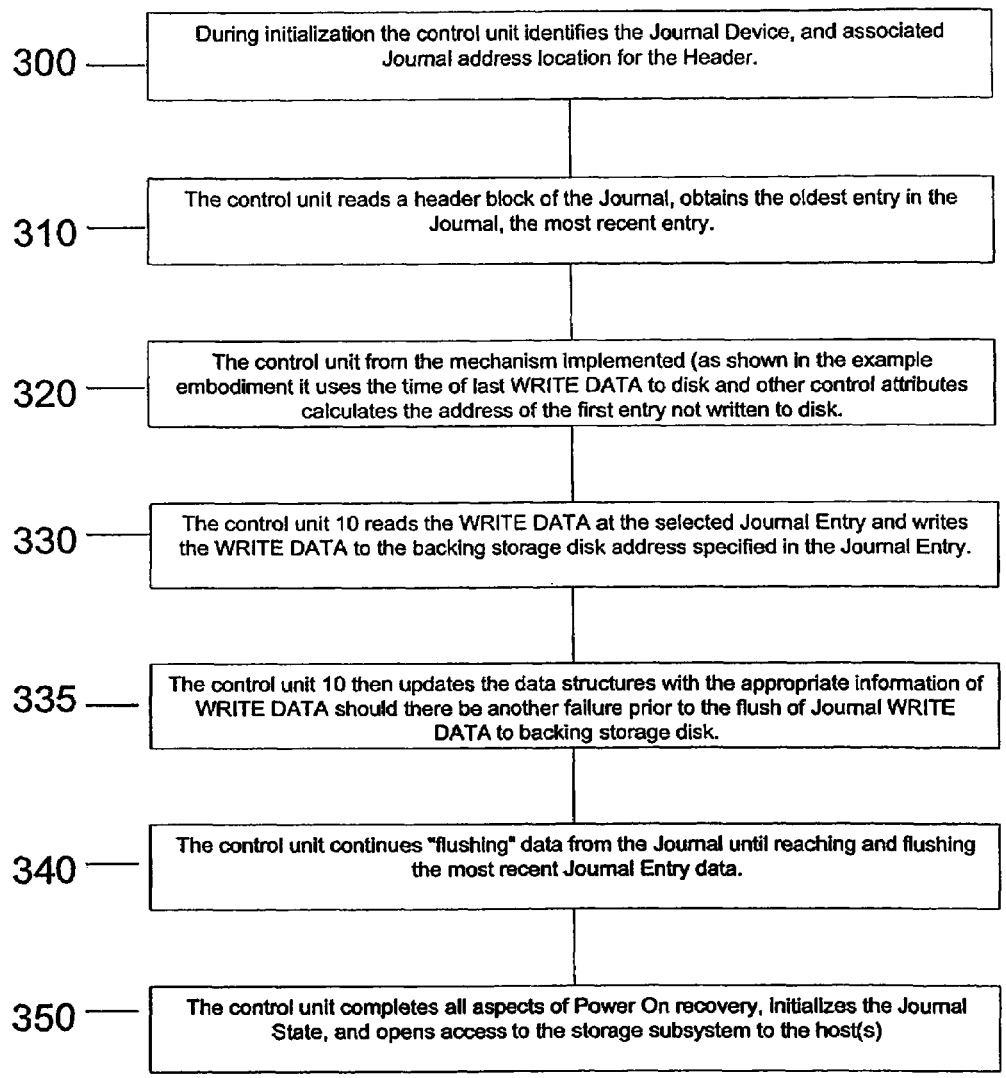
FIG. 7 is a flow chart illustrating an embodiment of a method for implementing a power loss recovery operation using the Journal log of the present invention.

In the example embodiment, in step 330 of FIG. 7, the storage control unit 10 starts a flushing process which begins with calculation and reading of the Journal Entry 65a (oldest not written) with a time and algorithmic attributes of the controller cache 14 and proceeds thereafter through the sequential entries to and including the last (most recent) entry.

Recovery From Control Unit Failure

Figure 8:
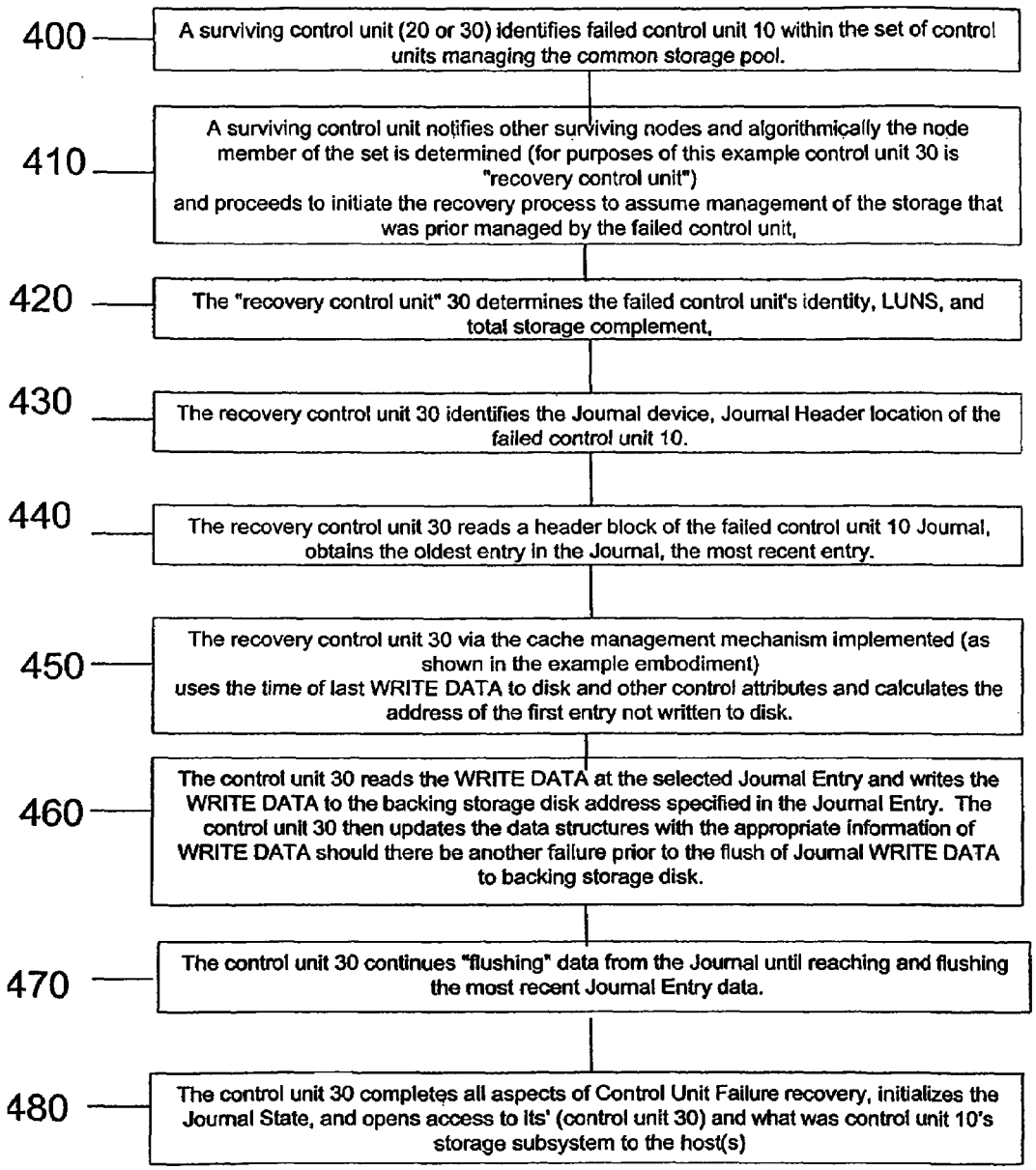
FIG. 8 is a flow chart illustrating an embodiment of a method for implementing a control unit failure recovery operation using the Journal log of the present invention.

Referring to FIGS. 2 and 8, in step 400, the storage control unit 10 which has failed is detected through use of a "failure detection" mechanism used by the set of control units 10, 20, 30 managing the common storage pool of the disks 42. Various methods of such detection are known to those skilled in the art and hence details of detection are omitted. Once a member of the set of control units 10, 20 and 30 is noted to have failed, the processing proceeds to step 410 wherein a member of the set of control units is selected (or asserts) to assume the storage management of the LUNS that were managed by the failed control unit. For example, with reference to FIG. 2, it will be assumed herein that control unit 10 is the failed control unit and the storage control unit 30 will assert control in place of the storage control unit 10 as the "recovery control unit." In step 420 the storage control unit 30 determines the failing control unit's 10 identity, LUNS, and total storage complement, this is to say, the storage devices 42 and 44 the failed control unit 10 was responsible for. The recovery control unit 30 then identifies the Journal Storage Device 44 and Journal Header 66 address location for the failed control unit 10 in step 430.

In step 440 the recovery control unit 30 reads the header block 66 of the failing control unit Journal 60 and obtains an address of the oldest and most recent entries as depicted in the recovery operation shown FIG. 8. As shown in the example embodiment, the recovery control unit 30 next, in step 450 and step 460, via knowledge provided by the cache management algorithm determines the "oldest not written" entry 65a as shown in FIG. 6.

The storage control unit 30 then proceeds to read the WRITE DATA 62 of selected Journal Entry 65a and writes the WRITE DATA 62 to the backing storage disk address specified in the Journal Entry 65a. The storage control unit 30 then updates the data structures 66 with the appropriate information of WRITE DATA should there be another failure prior to the flush of Journal WRITE DATA to backing storage disk. In step 470, the recovery control unit 30 iterates through the Journal entries and continues "flushing" data from the Journal 60 proceeding through successive Journal entries until reaching and flushing the most recent Journal Entry data 65*n*.

In step 480, the storage control unit 30 completes all aspects of Control Unit Failure recovery, initializes the Journal State, finalizes the failover controls of what was the storage control unit 10's LUN's and storage and opens access to the host computers 35 of the storage subsystem of both control units 10 and 30. By this process the storage control unit 30 assumes operations of the storage control unit 10.

The failing Journal Device and locations of control unit 10, as shown in the example embodiment, will not be used until the failing control unit 10 is re-established with the segments of the storage pool and LUNS previously under it's control returned to its control.

The recovery control unit 30 Journal Device 44 and address range location is used for Journal Entries 65 for all active LUN's under control of control unit 30 including the transferred LUNS from control unit 10 after the fail-over. Once the failing control unit 10 is re-established and the LUNS are to be returned, all cached data for those LUNS are flushed by normal cache management controls within control unit 30 prior to the transfer process being initiated.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims. Such modifications include substitution of components for components specifically identified herein, wherein the substitute components provide functional results which permit the overall functional operation of the present invention to be maintained. Such substitutions are intended to encompass presently known components and components yet to be developed which are accepted as replacements for components identified herein and which produce result compatible with operation of the present invention. Furthermore, while examples have been provided illustrating operation, the present invention as defined in this disclosure and claims appended hereto is not considered limited to such examples per se. Furthermore, the signals used in this invention are considered to encompass any electromagnetic wave transmission provided that block level protocol is used for transferring data.

What is claimed is:

1. A method for reducing bandwidth requirements in a storage system including backing storage and which is used by a client computer system, comprising:
   providing a storage control unit connected to the client computer system and the backing storage, and the storage control unit being configured to receive write requests to transfer WRITE DATA received from the client computer to the backing storage using block level addressing protocol;
   providing a journal memory storage device logically and/or physically external to the storage control unit;
   providing data structures within a memory of the storage control unit configuring the storage control unit to determine a next journal address and space available in the journal memory storage device for a journal entry and WRITE DATA to be written;
   receiving in the storage control unit, from the client computer system, a write request to the storage control unit to store WRITE DATA, and in response thereto operating the storage control unit to perform the following journaling and data operations:
   storing WRITE DATA into a control unit cache memory contained in the storage control unit;
   creating, for storing in a journal entry in a journal log in the journal memory storage device, a journal entry meta-data identifying at least a LUN, address, and length for the WRITE DATA, said journal log being associated with the storage control unit;
   identifying, in the journal entry meta-data, position information detailing WRITE DATA attributes and arrival information of the Write Request for the WRITE DATA;
   storing header information in the journal memory storage device within a header descriptor of the journal log, the header information storing an "oldest written" and a "most recent written" cache entry of the WRITE DATA stored in the storage control unit cache memory, a first available address for entry of the journal entry meta-data and the WRITE DATA in the journal log, space available in the journal, and a time of last write to the backing storage;
   writing the journal entry including the WRITE DATA and the meta-data to a selected device location and block address of the journal memory storage device;
   upon completion of the writing the journal entry, returning an ending status to the client computer system without having written the WRITE DATA to a cache memory in another control unit and without another control unit having processed the WRITE DATA to form a cache entry;
   performing a data flush which writes the WRITE DATA from the write request of the client computer system stored in the storage control unit cache memory to the backing storage; and
   upon completion of said performing a data flush, updating status fields of the header information reflecting the data flush status to allow eventual re-use of an oldest journal entry location.

2. The method of claim 1, wherein said journal memory storage device has a faster response time than said backing storage and is one of non-volatile and backup battery supported.

3. The method of claim 2 wherein said providing a storage control unit includes providing a plurality storage control units each configured to effect said journaling and data operations, each of said storage control units being connected to at least one client computer system and the backing storage, and the storage control units being configured to receive write requests to transfer WRITE DATA received from the client computer to the backing storage using block level addressing protocol, the storage control units each having access to said journal memory storage device.

4. The method of claim 3, wherein failure of one of the storage control units occurs in a failed storage control unit and a recovery storage control unit of the storage control units addresses the failure, further comprising:
   detecting failure of the failed storage control unit;
   selecting the recovery storage control unit;
   a reading process operating the recovery storage control unit to identify and read a journal log associated with the failed storage control unit;
   a flushing process operating the recovery storage control unit to flush un-flushed data, of the WRITE DATA stored in the journal log associated with the failed storage control unit, to the backing storage;

an assumption process operating the recovery storage control unit to assume functions of the failed storage control unit including:
- accepting write requests from the client computer system previously handled by the failed storage control unit;
- writing received WRITE to portions of the packing storage associated with the failed storage control unit; and
- performing said journaling operations associated with the write requests from the client computer system previously handled by the failed storage control unit including defining a journal log associated with such write requests in the journal memory storage device.

5. The method of claim 4, wherein the journal memory storage device is a plurality of SSDs located physically external to the storage control units.

6. The method of claim 4, wherein said storage control units do not provide mirror caches to others of said storage control units.

7. The method of claim 4, wherein said journaling operations do not require overhead operations of ones of said storage controllers other than a respective one of said storage controllers performing the journaling operations.

8. The method of claim 4, wherein said client computer system includes a plurality of client computer systems, and said client computing systems perform caching operations at file system structure levels independent of said storage control units.

9. The method of claim 3, wherein power loss shuts down one of the storage control units, further comprising said one of the storage control units being configured to execute the following power loss recovery process initiated with power on of said one of the storage control units:
- querying said header information for indication of an uncontrolled power off condition;
- flushing to the backing storage WRITE DATA from the journal entries starting at an oldest entry not written journal entry, and progressing forward until a most recent not written journal entry if an uncontrolled power off condition is indicated; and
- initializing said header information on the journal memory storage device to a starting state.

10. The method of claim 9, wherein said flushing to the backing storage WRITE DATA comprises:
- identifying said journal memory storage device and said header information associated with said one of said storage control units;
- obtaining said header information;
- obtaining an address of said oldest not written journal entry and said most recent not written journal entry; and
- sequentially obtaining WRITE DATA disk address for each journal entry and writing said WRITE DATA of the journal entry to the backing storage starting at said oldest not written journal entry and ending at said most recent not written journal entry,
- wherein said flushing is executed without accessing a cache memory of another one of said storage control units.

11. The method of claim 10, wherein the journal memory storage device is a plurality of SSDs located physically external to the storage control units.

12. The method of claim 10, wherein said storage control units do not provide mirror caches to others of said storage control units.

13. The method of claim 10, wherein said journaling operations do not require overhead operations of ones of said storage controllers other than a respective one of said storage controllers performing the journaling operations.

14. The method of claim 10, wherein said client computer system includes a plurality of client computer systems, and said client computing systems perform caching operations at file system structure levels independent of said storage control units.

* * * * *

UNITED STATES PATENT AND TRADEMARK OFFICE
CERTIFICATE OF CORRECTION

| | | |
|---|---|---|
| PATENT NO. | : 8,024,525 B2 | Page 1 of 1 |
| APPLICATION NO. | : 12/220622 | |
| DATED | : September 20, 2011 | |
| INVENTOR(S) | : Kenneth Lewis Willis et al. | |

It is certified that error appears in the above-identified patent and that said Letters Patent is hereby corrected as shown below:

Column 19, line 7: insert --DATA-- after "WRITE".

Signed and Sealed this
Twenty-eighth Day of February, 2012

David J. Kappos
*Director of the United States Patent and Trademark Office*